United States Patent

Scott et al.

[11] 3,913,992
[45] Oct. 21, 1975

[54] EXTENDED BEARING LUBRICATION METHOD AND APPARATUS

[75] Inventors: William P. Scott; Charles J. Swartz, both of Ponca City, Okla.

[73] Assignee: Continental Oil Company, Ponca City, Okla.

[22] Filed: Apr. 26, 1972

[21] Appl. No.: 247,578

[52] U.S. Cl. ................ 308/187; 308/86; 184/1 R
[51] Int. Cl. .......................................... F16c 1/24
[58] Field of Search ....... 308/187, 86; 184/1 R, 1 E, 184/70

[56] References Cited
UNITED STATES PATENTS
3,004,806  10/1961  Schinnerer .................. 308/187
FOREIGN PATENTS OR APPLICATIONS
1,070,455  4/1959  Germany .................... 308/187
80,916    1934    Sweden ...................... 308/187
72,167    1931    Sweden ...................... 308/187
39,848    1913    Germany ..................... 308/187

Primary Examiner—Charles J. Myhre
Assistant Examiner—R. H. Lazarus
Attorney, Agent, or Firm—William J. Miller

[57] ABSTRACT

Lubricating oil is dispensed at a slow rate over a long period of time to a bearing surface to be lubricated in a bearing structure having a relatively rotating hub and shaft assembly. The mass of grease is placed on a dispensing surface located on a surface of the rotating member of the assembly which faces the axis of rotation so that the centrifugal force of the grease mass against the dispensing surface causes oil release, while the grease body remains in place. The grease support surface may be integral with the bearing assembly or be provided by a removable grease support ring.

13 Claims, 8 Drawing Figures

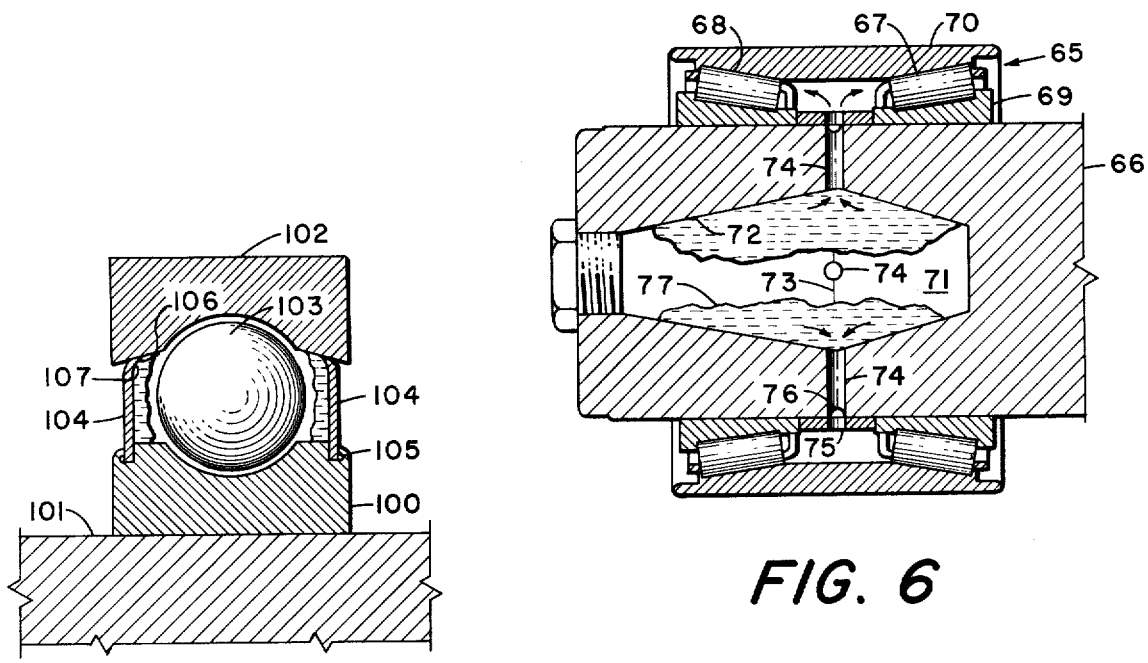
FIG. 6
FIG. 8
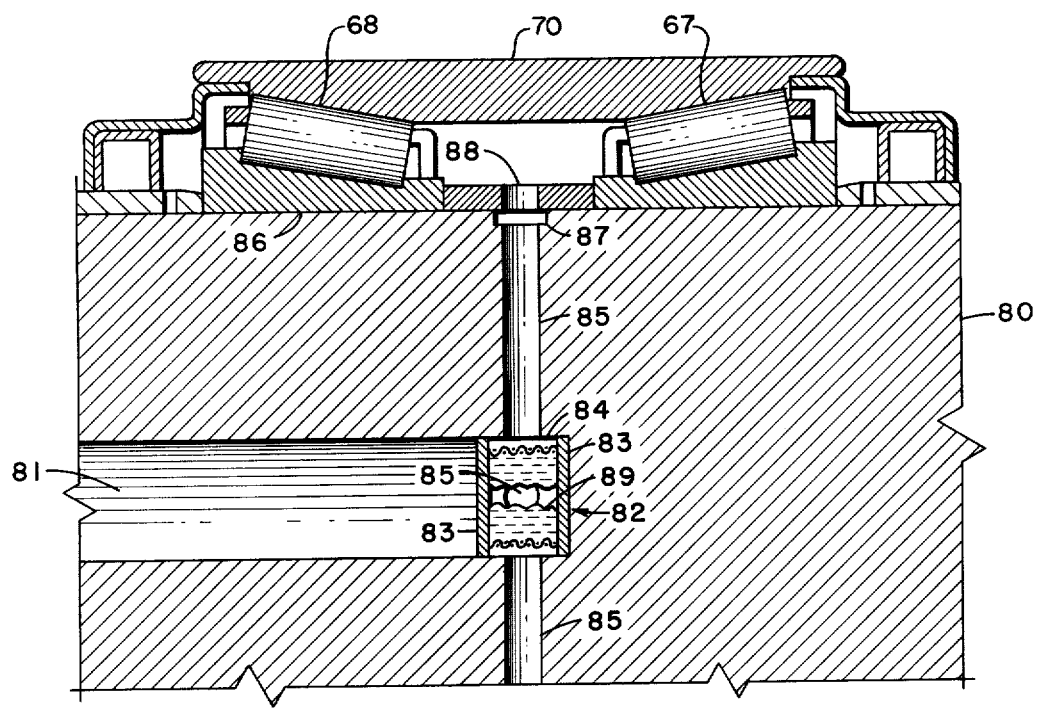
FIG. 7

EXTENDED BEARING LUBRICATION METHOD AND APPARATUS

BACKGROUND OF THE INVENTION

This invention relates to a method and apparatus for extending bearing life by dispensing oil from a grease reservoir to the bearing as needed.

In assemblies in which one member rotates relative to the other, the life of the bearing surfaces between them depends upon renewal of the lubricant to the bearing surfaces as the lubricant is destroyed or otherwise depleted. With high loads and high speeds the problem is aggravated, and whether the bearing is permanently sealed or the lubricant reservoir is replenished from time to time, a simple construction requiring little or no maintenance is economically favored. Despite the reputation of oil-lubricated bearings for longer life than grease-lubricated bearings, solid grease as a gelled lubricant has unique inherent structural advantages since it stays in place well and does not require the mechanical dispensing and reservoir structure associated with liquid lubricants. Packing with grease is common, for example, in automobile wheel bearings, and grease cups in various kinds of bearings attest to reliability of grease in lubricanting bearings under difficult physical conditions.

In a freshly packed bearing, however, the large excess of grease is promptly purged from the bearing upon initial run-in. Most of the grease purged is wasted and unavailable to renew the lubricating film as it deteriorates. A degree of extended life lubrication may be sought in maintaining a grease reservoir in a grease cup, but if the reserve grease is forced under pressure or melted to cause it to flow between the bearing surfaces, the soap structure of the grease as well as the oil stored in it enters the bearing and may sooner or later increase the bearing friction. In short, very slow soap-free lubricant feed from a limited reserve (whether that of a one-time lubricant charge of a sealed bearing or of a periodically replenished charge) desired for extended bearing life has not been realized in the past by the use of grease nor have the oil feed systems enjoyed the mechanical simplicity of grease packing.

SUMMARY OF THE INVENTION

The primary object of the invention is to provide continuous bearing lubrication by release of oil from grease and thus extend bearing life.

It is also an object to provide bearing systems with grease masses outside the bearing surfaces serving as the reservoir structures of oil released under centrifugal force.

A further object is to utilize centrifugal force of a grease mass in a rotary bearing to assemble released lubricating oil from the grease for supply to the bearing surfaces without resort to melting of the grease or otherwise introducing the grease itself to the bearing surfaces.

Another object is to provide a very efficient, reliable, and economical use of grease as a lubricating oil reservoir for extended-life bearing lubrication.

According to our invention, the grease charge is placed, suitably as an adhering ring, on a rotary oil dispensing support surface in a rotary bearing assembly. The grease mass remains in place without change in size or shape but releases oil due to centrifugal force on the grease. An oil escape path is provided from the support surface to the bearing surface so that oil released can flow to the bearing under centrifugal force or gravity or both, but the grease itself is not introduced between the bearing surfaces. The support surface is located in the rotating one of the bearing assembly members, whether it be an inner rotary shaft or an outer rotary hub, and faces the axis of rotation at a radius not greater, and preferably less, than the radial displacement of the bearing surface which is to receive the released oil. The centrifugal force of the grease mass against the support surface results in the release of oil from the grease at the grease-support surface interface. The oil release rate varies with the centrifugal force which in turn is a function of the rotary speed as is also the lubricating oil requirement.

For a bearing assembly in which the outer hub rotates around a stationary inner shaft, the grease support surface facing the axis of rotation is located on a collar in the hub or other inner hub surface. The released oil flows from a support surface under centrifugal force to the bearing surface on the rotary member. Once between the relatively moving bearing surfaces, the oil is distributed rapidly through the bearing.

For a bearing assembly in which an inner shaft rotates within a stationary hub or other housing, the shaft is either provided with a collar or hollowed to define a grease support surface facing the axis of rotation. An escape route from the support surface permits the released oil to flow radially outward from it under centrifugal force to a facing surface of the stationary member communicating with the bearing. The released oil then flows on the stationary surface by gravity to enter the bearing.

The oil release is believed to be a response to a shear stress on the grease body at the grease-solid surface interface. The shear stress is caused by the reaction of the support surface against the base of the grease mass urged by centrifugal force against it. Such a centrifugal force magnitude is many times greater than the gravitational force on the grease (at low bearing speeds for which the gravitational force and centrifugal force would be of the same order of magnitude the lubrication problem is a much different one) but is less than the yield stress at which the grease body would be deformed. This subcritical shear stress encountered at the grease-solid interface causes the oil release at the interface in useful amounts for extended length lubrication. Observations support a useful general rule that a nonreversible release of oil occurs from the sheared interface when the shear stress is somewhat less than the yield stress of the grease and the oil has an escape route. In its physical aspect, the oil release may appear somewhat similar to "weeping" of grease, but should not be associated with insufficient milling in the preparation of the grease or with melting or other deterioration of the grease soap structure. Our paper entitled "The Oil Release Response of Grease," published in the NLGI Spokesman, July 1970, pages 124–129, contrasts this kind of oil release mechanism which we believe explains the extended lubrication achieved in our inventions as contrasted with more conventional explanations of the release of oil from grease under pressure.

Lubricating greases suitable for use in our invention may be defined as a gel having the following properties: (a) its continuous phase is a lubricating oil, (b) it obeys plastic rheology (e.g., power law fluid flow above the yield stress), and (c) the continuous phase is released from the gelled structure under shear stresses less than the yield stress of the gel. Put in other words, the gelled lubricant mass consisting essentially of a stable soap structure filled with lubricating oil should be stiff enough to remain in place under conditions of temperature and centrifugal force encountered without melting or deformation. Since the soap structure of the grease does not itself enter the bearing, the selection of the grease need not be limited by considerations of the effect of residual soap within the bearing. To the extent that lubricant additives, such as anti-oxidants, are desired for a particular lubrication application, the oil, rather than the soap structure, should be the vehicle. Specification or measurement of the yield points at the temperatures involved or of the centrifugal forces and shear stresses at the speeds involved are not usefully helpful data in specifying a grease for a particular lubrication application. The easily observable required conditions consistent with release below the yield point is that the grease body neither deform or melt under the variety of conditions encountered in an installation, and the grease melting temperature and stiffness be selected accordingly. The area of the grease-solid interface and the amount of grease employed can also be increased to assure a sufficient release rate and release duration for given operating conditions.

BRIEF DESCRIPTION OF THE DRAWING FIGURES

The invention can be best understood when reference is made to the drawings wherein:

FIG. 6 is a cross-sectional view of a modified railway car wheel bearing incorporating the invention;

FIG. 7 is a cross-sectional view of a portion of a modified bearing assembly; and FIG. 8 is a cross-section of a portion of a sealed ball bearing.

DESCRIPTION OF THE PREFERRED EMBODIMENTS

Figure 1:
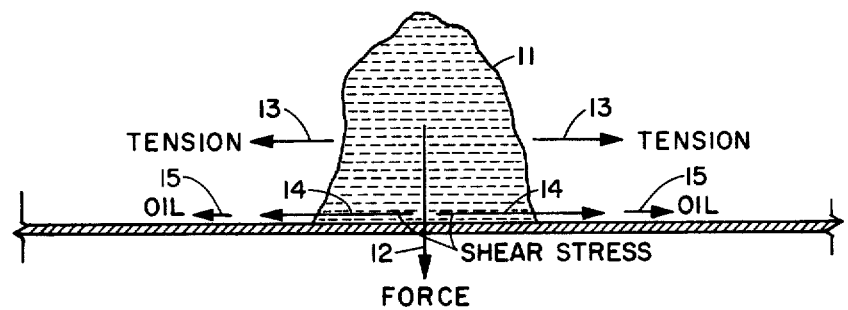
FIG. 1 shows a mount of grease or gelled lubricant on a surface illustrating the forces causing the oil release.

FIG. 1 is a diagrammatic representation of a mass of lubricating grease as a dispensing reservoir of lubricating oil. A solid support surface 10 carries the mounted grease mass 11. The grease is solid in the familiar sense in that it is a plastic but self-supporting structure. The surface 10, typically a metallic surface, is solid or stiff in the usual sense, and need not be imperforate. A fine wire screen or sieve is a solid support surface in this sense.

When the grease mound 11 is accelerated as a whole to generate a force in the direction of the arrow 12 against the solid surface 10, the opposing reaction force of the surface is against the base of the grease mound. The tendency of the grease mound to flatten and expand radially against the support surface 10 is resisted until grease yield point is reached. Arrows 13 directed radially outward from the mound parallel to the surface 10 represent tensile stress resisted by the grease structure. The shear stress at the base of the mound, represented by radially outwardly directed arrows 14, where it has an interface with the solid support surface, causes oil release from the grease structure. This oil also flows outwardly from the interface at the periphery of the mound, as indicated at 15, or through the support surface if the surface is perforated. It is this slow release of oil without flow of the grease itself occurring before the yield point of the grease is reached which is relied upon in our invention. The oil flow continues while the sub-critical stress is maintained and oil remains in the soap structure.

Figure 2:
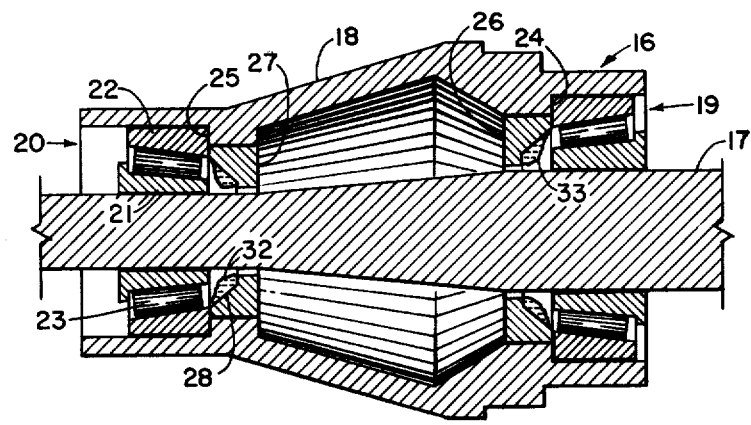
FIG. 2 shows a cross-sectional view of a roller bearing assembly incorporating the invention.
Figure 3:
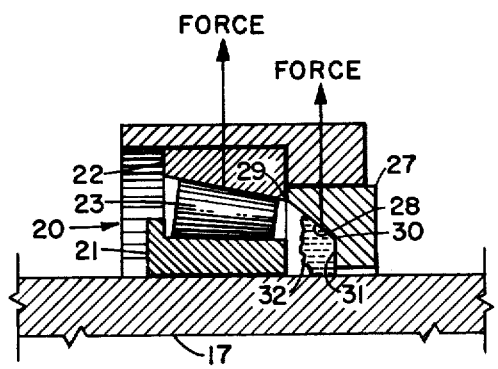
FIG. 3 is a detail of FIG. 2.

Referring particularly to FIGS. 2 and 3, a practical embodiment of the invention in an automobile front wheel bearing assembly is represented at 16. In this type of assembly, an axle section 17 is stationary with respect to the wheel hub 18 which rotates around it. A spaced pair of tapered roller sets are employed as is conventional in such front wheel assemblies for accommodating both the weight and thrust loads on the axle. The inboard bearing 19 closer to the knuckle pivot is typically of somewhat larger size than the outboard bearing 20. Each bearing has an inner race 21 and an outer race 22 with a set 23 of tapered rollers in circular array between them. The hub 18 is bored at each end and provided with end stops or shoulders 24 and 25 to receive and position the bearing races.

In conventional use, the hub is sufficiently packed to force the grease between the bearing surfaces, although only a small, but initially sufficient, amount of lubricant remains between the bearing surfaces during operation. Seals and closures are not shown, but it whould be appreciated that it is useful to prevent grease or oil from splashing or dropping onto associated equipment. In this instance it is usually important that any excess lubricant be kept away from the brake drum.

Referring to the oil dispensing means of our invention, the otherwise conventional bearing assembly carries a removable grease collar or ring, suitably made of machined steel, adjacent the inner end of each bearing of the hub, one ring 26 being opposite the inner bearing at the shoulder 24 and the other ring 27 being opposite the outer bearing at the shoulder 25. As shown in FIG. 3, the ring 27 is formed to be pressfitted in the hub 18 so that it will stay in place as the hub rotates. The ring inner diameter is made large enought to completely clear the axle 17 and need not closely approach the axle. The function of the grease ring is to define the grease support and oil transfer surface 28 facing the axis of rotation. The surface 28 is in this case a flat surface at a conical or sloping angle of approximately 45° to the axis so that it has a substantial component parallel to the axis. Its maximum radius limit edge 29 at the surface of the ring adjacent the bearing 20 coincides with or is less than the inner diameter of the adjacent outer bearing race 22 so that oil flowing along the surface 28 can enter the bearing without obstruction. The minimum radial terminus 30 may be at the inner diameter of the ring but here a vertical retaining wall 31 (that is, at right angles to the ring axis) is provided for grease packing convenience between the minimum diameter of the support surface 28 and the inner diameter of the ring.

In use, the support surface 28 is smeared with grease to define a grease ring 32. The retaining wall 31 facilitates loading or packing the surface with enough grease to define a circular mound. Only the ring, and not the bearing itself, need be packed or repacked as the lubrication need arises. When the hub rotates the centrifugal force of the grease ring against the support surface results in the slow, essentially velocity-metered release of oil previously described. Since the surface 28 also has a component in the direction of centrifugal force, the released oil flows radially outward and into the outer race of the bearing. Once the oil flows onto a bearing surface it is picked up by the rotating rollers and distributed to the bearing surfaces of the races. This oil release continues slowly during operation to maintain the oil film in the bearing. The grease structure, due to its adhering nature and its structure as a ring, remains in place. The inboard bearing grease collar or ring 26 is similar, except in size, and carries a grease ring 33 which functions in the same way.

When the bearing is inspected at periodic intervals, the grease rings with so much of the oil as remains within their structures may be removed and new grease rings smeared in place. Since a continuing oil supply is thus assured, bearing inspection schedules can be extended.

Figure 4:
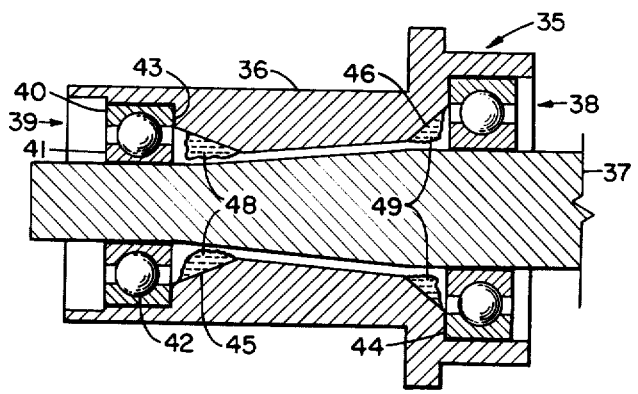
FIG. 4 shows a cross-sectional view of a ball bearing assembly incorporating the invention.

The bearing hub may also be designed as in FIG. 4 to define a grease support surface without the use of the auxiliary grease rings 27 and 28 in the FIG. hub, which has a conventional large inner diameter in its central portion into which released oil would flow in the absence of the rings or other retainers. The FIG. 4 bearing assembly 35 has a rotary hub 36 and a stationary axle with inboard and outboard anti-friction bearings 38 and 39 between them. The bearings, shown as conventional ball bearing in this example, have outer races 40 which fit into bores in the hub, inner races 41 fitted on the axle, and a circular array 42 of bearing balls between each inner and outer race.

The outer race of the outboard bearing fits against a bore shoulder 43 in the axle, the shoulder depth being equal to or slightly greater than the depth of the outer race. The inboard bearing is similarly fitted with respect to the bore shoulder 44. The inner walls of the hub are sloped from both bearing shoulders toward the axle to define respective grease support surfaces 45 and 46. The remaining central span of the inner hub surface 47 between surfaces 45 and 46 suitably follows the axle contour but is spaced from it. Since the central hub span 47 is not used or needed for carrying packed grease and would serve no useful purpose in accumulating whatever excess oil might flow there, its contour is either straight as in FIG. 4 or directed convexly toward the axis of rotation. The grease rings 48 and 49 smeared on the sloping surfaces perform as in the FIG. 2 assembly, the oil released because of the centrifugal force of the grease masses against the support surfaces results in a flow of the released oil under centrifugal force into the bearings as before described.

Figure 5:
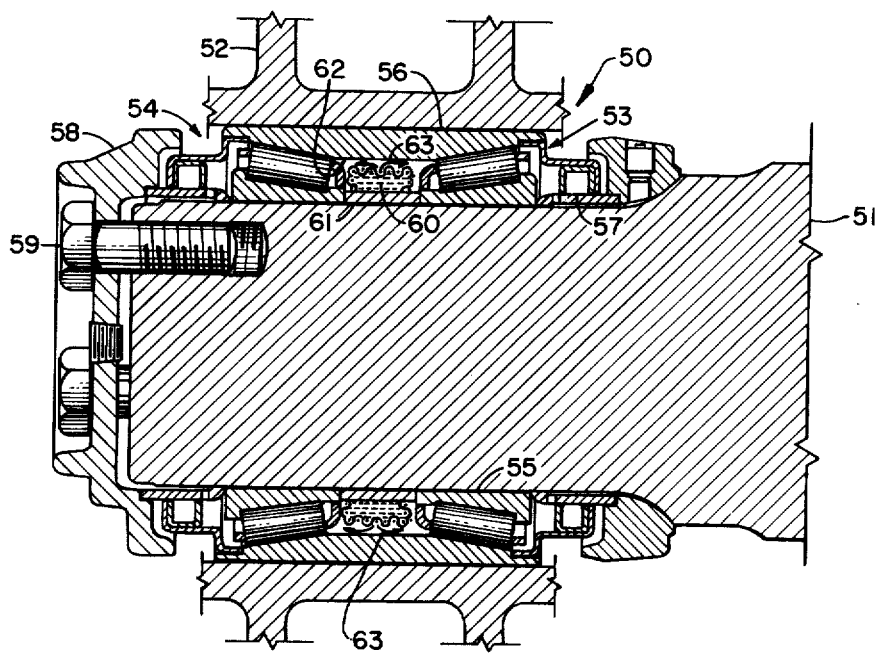
FIG. 5 shows the adaption of the invention to a railway car wheel bearing.

In some bearing applications, the shaft rotates and the hub or outer bearing retaining system is stationary. A conventionally configured railroad car bearing of this type with minimum structural modifications for the practice of our invention is shown in FIG. 5. In this bearing assembly 50, the end of the rotary axle 51 is shown together with a stationary journal box or housing portion 52. Two sets of opposed roller bearings 53 and 54 are carried between a common inner race 55 and a common outer race 56. Since heavy duty bearings of this type are usually heavily packed with grease, grease seals 57 are shown. Also shown is the bearing retaining end cap 58 which is secured to the shaft end by screws 59.

Instead of grease packing the bearing, a grease-support screen collar or cage 60 is mounted on the central span 61 of the rotating inner race midway between the two sets of tapered roller bearings. The screen cage side walls carry a screen cylinder between them to define a container for the grease. The top of the screen cage, which is to say the maximum radius portion spaced from center span inner race 61 by the cage side walls and is also spaced from the stationary center span 62 of the outer race to avoid any frictional contact with the latter. This cage periphery serves as the solid support surface for the grease within the cage and its resistance to the centrifugal force of the grease when the axle or shaft rotates results in the oil release. The cage screen may suitably be standard ASTM 100 or 200 mesh screen, or may be a sheet material with small holes drilled through it. The purpose of the metal of the screen is to provide the support surface; the purpose of the holes or openings is to provide an escape path for the released oil. Escaping oil droplets bridge the gap or are flung under centrifugal force to the stationary central inner surface 62 of outer race. Since the inner surfaces 62 of the outer race are cylindrical and the axis of rotation is normally horizontal, the released oil tends to flow downward toward the bottom of the race where, if it has not already moved laterally into the bearing surfaces, it flows into both sets of roller bearings. To some extent, the oil creeps over the race into the bearings against centrifugal forces. Once under the rollers, of course, the oil is picked up and distributed quickly throughout the bearing surfaces. Arrows 63 represent the oil flow into the bearings.

Another version of the railroad car wheel bearing is shown in FIG. 6 in which the axle itself is modified to provide a grease support surface facing its own axis of rotation. In this bearing 65 the rotating axle 66 has positioned around it two sets of roller bearings 67 and 68 in position between a common inner race 69 and a common outer race 70. Instead of packing the bearings with grease, the axle is bored to define a grease cavity 71 having conical or sloping side walls 72 meeting at their largest diameters or apex in the plane of the center line 73 of the bearing assembly between the two sets of rollers. A series of small radial holes are bored at spaced points around the shaft periphery in the plane of the center line to define oil passages 74 communicating with the cavity 71. Corresponding bores 75 in the center plane of the inner race 69 complete the passage to the space between the bearing races. A small circumferential groove 76 around the axle connecting the passages 74 obviates any necessity of angularly aligning them with the race passages.

Grease is packed in the cavity around the side walls 72 which form the support surface against which the grease mass 77 is urged by centrifugal force when the shaft rotates. The bores 74 provide the escape path for the released oil around their inner peripheral edges. The bores are small, at least at the inner surface of the axle, so that the grease mass is supported without shearing at the centrifugal forces involved.

As in the FIG. 5 apparatus, the released oil flows under centrifugal force into the space between the bearing races and across that space to the inner surface of the outer race. The oil on the inner wall of the outer race flows downwardly and spreads to the edges of the facing roller arrays. The released oil flow will be less in the FIG. 6 embodiment than in the FIG. 5 embodiment for a given grease and at a given axle rotation rate because the grease support surfaces defined by the cavity wall 72 has a lesser radius than the oil support surface of the screen cage 60.

Various modifications of the FIG. 6 embodiment, as well as of the other embodiments, will be obvious to those skilled in the art. For example, the railway wheel bearing of FIG. 6 may be modified as shown in part in FIG. 7 to employ a removable grease cage or collar in which the rotary shaft 80 has a central bore 81 into the end of which a grease cage 82 similar to that of FIG. 5 is fitted. The grease cage may have annular end plates 83 which fit into the bore with a cylindrical screen suppport surface 84 positioned between. The screen cylinder 84 is of slightly less diameter than the bore 81 to avoid blocking the flow of released oil through the screen openings. A series of radial bores 85 between the cage cylinder and the central plane of the inner bearing race 86 provides part of the oil passageway. A circumferential groove 87 and bores 88 through inner bearing race 86 complete the passageway to the space between the bearing races. Oil released from a grease mass 89 packed in the cage 82 flows to the bearing surfaces as previously described.

It should be appreciated that in the foregoing examples in which the released oil reaches a stationary surface communicating with a stationary bearing surface, gravity is always available to lead the released oil to an active bearing surface edge where it is picked up and distributed between the relatively moving surfaces. It is not necessary that oil enter the bearing everywhere around its periphery. The use of a circular ring of grease rather than off-center mound segments is not necessary for lubrication, but the larger effective shear-stress area provided for oil release as well as the larger effective reservoir thus provided makes the continuous grease ring or collar advantageous. It is simpler to use the conventional angular symmetry of the bearing assembly configuration for relatively rotating parts to full advantage than not to. As mentioned previously, the shear stress at which useful oil release results from centrifugal forces insufficient to cause the grease body to yield and deform are many times greater than gravitational force acting on the grease. By the same rule, the released oil on the rotating surface is subject to centrifugal acceleration which makes all greater radius (i.e., greater distance from the axis of rotation) surfaces "downhill" to oil flow, regardless of the gravitational up or down orientation of the surface. Oil transferred to the stationary race in a rotating shaft type of assembly as shown in FIGS. 5, 6, or 7, is no longer subject to centrifugal force, but whatever downhill gravitational flow is needed is available since the centrifugal force has transferred the oil to a gravitationally uphill location with respect to at least part of the bearing periphery. In this important sense, the same force acting on the released oil which accounts for its release also accounts for its complete flow path to the relatively moving bearing surfaces where the oil is distributed as an anti-friction film.

In both the rotary axle and rotary hub bearing assemblies shown, neither the conventional horizontal alignment of the axis of rotation nor departures from it defeat completion of the path of the released oil. For a type of bearing installation in which a rotary shaft remains vertical, a single grease ring or case should not be relied upon to divide oil between bearings both above and below the grease ring. In such vertical rotary shaft installations, a grease ring or cage should be positioned above any bearing set to be lubricated. In the unusual circumstances that the shaft may be operated for long intervals of time at any angle, a grease ring or cage should be positioned on each side of any bearing set for maximum assurance of long life lubrication.

EXAMPLES I THROUGH V

In order to assess the superiority of the system abovedescribed, test examples I-V were made employing the low-load but hightemperature condition of the ASTM D-1,263 Automotive Wheel Bearing Test (ASTM being the initials for American Society for Testing and Materials) entitled "Leakage Tendencies of Automotive Wheel Bearing Greases". Bearing life test measurements are not likely to be repeatable, and the variations here on a known test procedure are intended to furnish persons having accumulated knowledge of standard test results and variations to appreciate the significance of these test results. The outer radial position of the wheel hub in the ASTM D-1,263 test is normally filled with grease level with the bearing races. A normal charge for the leakage test is 90 grams of grease. Two grams are used to pack the small outboard bearing 22 and three grams used to pack the large inboard bearing 21. The remainder is used to fill the inner hub cavity to a level practically even with the races. The assembled hub 31 is then rotated in a heated box at a speed of 660 ± 30 rpm for 6 hours at a spindle temperature of 220°F. Leakage of grease or oil, or both, is measured. Good lubrication practice for automotive (includiing truck) bearings calls only for coating the spindle and inside of the hub with a thin layer of grease to prevent rusting. In actual practice, packing the bearings with 90 grams of grease might cause generation of excessive temperature and leakage to the brakes.

In the examples below, the wheel bearing assembly tested was that of FIG. 2 but with only the small outboard bearing under observation. The inboard bearing was kept appropriately lubricated to avoid affecting the outboard bearing test observations.

EXAMPLE I

The outboard bearing of the ASTM D-1,263 test apparatus corresponding to FIG. 2 but without a grease support ring was installed dry (no lubricant) and the test apparatus run at 235°F. spindle temperature and 660 rpm. The outboard bearing failed in 1 5/6 hours as indicated by noise and fretting (oxidative wear) on the roller ends and on the spindle carrying the cone race. Short life in the complete absence of lubrication is to be expected, despite the fact that the bearing is only lightly loaded, and this test confirmed that expectation.

EXAMPLE II

Using the Example I apparatus, the small outboard bearing was dipped in a solution of 95 volume percent hexane and 5 volume percent of a solvent-refined oil having a viscosity of 170 SSU at 100°F. The bearing was allowed to dry (that is, the hexane evaporated) leaving an almost dry film of oil on the bearing surfaces. The apparatus was assembled and run at 235°F. A high noise level developed after six hours operation.

On removing the bearing fretting damage was noted by the present of red iron of oxides on the roll ends along with an oxidized film of oil evidenced by a dark brown stain. This test also confirmed what could be reasonably expected —that a very small film of oil lubricates the sliding surfaces well at light loads, but for only a very limited period.

EXAMPLE II

The ASTM D-1263 apparatus of Example I was employed. One gram of grease was packed in the outboard bearing. The grease employed was an all-purpose lithium hydroxy-stearate grease. After 72 hours at 235°F. and 660 rpm, the bearing became noisy. The test was then halted and the bearing inspected. No grease was left and the bearing appeared dry. There was no appearance change indicating damage. The test was resumed and at 245 hours total the bearing failed. At failure the inner race was heavily scored, the milled finish worn, parts of the surfaces were blued due to heat generation, and the ends of the rollers were worn and blued. The longer life than that of Example II is attributed not to the superiority of grease over oil, but to the fact that the excess grease forced the ends of the races after run in remained as a lubricant supply available through melting and contact with the bearing surfaces.

EXAMPLE IV

The ASTM D-1263 test apparatus was set up in the same manner as in Example II with a thin film of oil on the outboard bearing. In addition, a metal grease support ring having a dispensing support surface inclined 15° from the axis of rotation (see FIGS. 2 and 3) installed in the hub just behind the outboard bearing race. The dispensing surface radius ranged from about 1.3 to about 1.5 cm. A bead of the same grease used in Example III (totaling about one gram) was laid as a continuous ring on the inclined support surface. At 660 rpm, the reaction force of the dispensing surface against the centrifugal stress of the grease is calculated to approximately 2,000 dynes/cm$^2$. No grease was in contact with any of the bearing surfaces. The grease contained a red dye, making it easy to observe any oil released. The test was started at 235°F. After three hours it was stopped, and we observed that the grease ring retained its shape, location, and appearance but had released red-colored oil which has flowed onto the outer bearing race. This test was continued for 60 hours, at which time, the bearing was still obtaining lubricant from the grease. There was no evidence of wear, fretting or oxidation. We discontinued the test since the tese severity seemed obviously insufficient to cause failure in a reasonable time limit.

EXAMPLE V

The ASTM D-1,263 apparatus corresponding to Example IV with the metal grease support ring was employed in this test, but the outboard bearing was installed dry with no lubrication. One gram of grease was placed on the inclined surface of the support ring as in Example IV. The grease was the same as in Examples III and IV. The apparatus was run at 235°F and 660 rpm. After 24 hours, the apparatus was stopped and the bearing inspected. The bearing was no longer dry but was lubricated. After 245 hours the test was stopped. At that point there was no bearing noise, the bearing was still lubricated, and no evidence of poor condition was visible upon inspection with a 20 power microscope. The grease ring itself had maintained its size, shape, and location and appeared unaffected. Some discoloration in the race was detected, but this appeared to be merely the result of grease oxidation and not of bearing wear.

The tests showed, as expected, that a dry bearing has a very limited operating life (Example I), that only a very small amount of lubricant is actually needed in the bearing (Example II), and that a grease packed bearing will run for a longer period of time than a bearing having no surplus lubrication (Example III). With the bearing initially having a thin film of oil and a grease ring on a dispensing surface in accordance with the invention, oil is released from the ring as the test proceeds to replenish the initial lubricating film and the bearing will not show effects of wear after an extended run (Example IV). Moreover, the oil dispensing mechanism of the invention is clearly not merely a backup or safety factor for an initial film lubricated or packed condition since the bearing may be started dry with a grease ring on a grease dispensing surface and operated for extended periods of time without evidence of wear (Example V). This contrasts sharply with Example III where the same amount of grease—1 gram—was packed directly in the bearing and in which the bearing became noisy after only 72 hours and had completely failed at 245 hours.

In view of the above examples, it can be appreciated that the advantages of the method can be achieved either in present bearing systems modified by the insertion of a simple grease support ring as illustrated in FIG. 2 or in bearing systems initially designed and manufactured to offer extended lubrication ability as illustrated in FIG. 2. It can be also appreciated without test demonstration that railroad bearings can be lubricated for much longer periods of time with a reduction in hot boxes in the embodiments described in FIGS. 5 and 6. It should be appreciated that while we have used the terms "shaft" and "hub" as exemplary of a bearing assembly in which one of the members is a rotor with respect to an inner or outer stator member, we have not intended to exclude rotor and stator being assemblies described in such functionally equivalent terms as "axle" and "bearing bracket", "spindle" and "sleeve", "journal" and "housing", and the like.

The invention affords several important advantages inherent in the use of a grease supply as an oil reservoir for release of oil outside the bearing surfaces rather than as a reserve to be introduced as either solid or melted grease between the bearing surfaces. It retains the advantage of grease over liquid lubricant and yet supplies a bearing with a continuous oil film, thereby drastically reducing the heat generated in a bearing during the initial run-in-time when the bearing essentially forces the grease out of the bearing and retains what little oil remains. The invention also drastically reduces the total quantity of grease required to provide adequate lubrication to a bearing system, since the only grease utilized, for example, in the railroad bearing (see FIG. 5), is the grease confined within the cage 75, while normally the entire space between the outer and inner race is packed with grease.

In FIG. 8, a portion of the sealed ball bearing race is illustrated having the invention incorporated therein. An inner race 100 is attached to a shaft 101. An outer race 102 retains a plurality of balls 103. A grease retaining ring or seal 104 is attached rigidly at 105 to the inner race 100 when the inner race is the race being rotated. A ramp 106 is formed in the stationary race 102. A curved portion 107 of seal 104 aids in conveying the released oil onto the ramp 106. In operation, when shaft 101 rotates, inner race 100 rotates, rotating seal 104. Grease being on said seal will have its oil released and conveyed to ramp 106 and into the bearing race. If the shaft 101 is stationary, then seals 104 will be attached to outer race 102 and ramp 106 will be formed on the inner race. In either case the shear force is formed at the intersection of seal 104 and curved portion 107.

It can be appreciated without departing from the spirit of the invention that the method of the invention can be practiced with various modifications of the bearing structure, and it is intended that these will fall within the claims appended hereto.

What is claimed is:

1. In a bearing assembly having a stationary element and a rotary element and including bearing surfaces therebetween, an improved extended life lubricating apparatus for supplying oil to the bearing surfaces comprising: a solid support surface on the rotary element which faces the axis of rotation and is spaced a radial distance from it less than or equal to the radial distance of said bearing surfaces from the axis of rotation, lubricating oil reservoir means consisting of a self-supporting lubricating grease mass comprising a gelled structure and a lubricating oil releasably trapped in the gelled structure releasable therefrom in response to a predetermined oil release shear stress carried on the support surface out of contact with the bearing surface subject to the centrifugal force of the mass against the support surface of a magnitude at least sufficient to apply the predetermined oil release shear stress to said grease mass but of a magnitude less than the predetermined yield stress of said gelled structure at the interface between said grease mass and the support surface for releasing oil therefrom at the base of the mass onto the support surface, and oil flow path means from said support surface to said bearing surface for conducting the released oil propelled by centrifugal force to the bearing surface.

2. The lubricating apparatus of claim 1 in which the support surface is defined on a removable annulus carried by the rotary element.

3. The lubricating stem of claim 2 in which the support surface is foraminous to permit released oil flow through it.

4. The lubricating apparatus of claim 1 in which the stationary element is a shaft and the rotary element is a housing surrounding it, and the oil flow path means from the support surface is defined by a rotary element surface contiguous with the bearing surface.

5. The lubricating apparatus of claim 1 in which the rotary element is a shaft and the stationary element is a housing surrounding it, and the oil flow path means from the support surface includes a portion of the surface of the stationary element radially beyond the support surface and contiguous with the bearing surface.

6. The lubricating apparatus of claim 5 in which the support surface is in a cavity within the shaft.

7. The lubricating apparatus of claim 5 in which the support surface is in a removable annular cage carried on the shaft.

8. In a wheel bearing assembly having a stationary axle carrying an inner bearing race and a rotary housing carrying an outer race with rolling bearing members between them, the improvement comprising:
grease support surface means in the housing facing the axis of rotation at a radius therefrom equal to or less than that of the outer bearing race for supporting a mass of lubricating grease,
said lubricating grease mass comprising a gelled structure and a lubricating oil releasably trapped in the gelled structure releasable from the gelled structure in response to a predetermined oil release shear stress applied to the lubricating grease mass which is less than the predetermined yield stress for deformation of the gelled structure, out of contact with the bearing races against the centrifugal force developed upon rotation of the housing of a magnitude at least sufficient to apply the predetermined oil release shear stress to said lubricating grease mass but of a magnitude less than the predetermined yield stress of the gelled structure at the interface between said lubricating grease mass and said grease support surface means, and
released oil transfer path means in said housing contiguous with the bearing surface of the outer race having a component in the direction of the centrifugal force for conducting released oil under centrifugal force to the outer race to lubricate the bearing.

9. In a wheel bearing assembly having a rotary axle carrying an inner bearing race and a stationary housing carrying an outer bearing race with roller bearing members between them, the improvement comprising grease support surface means carried by the axle facing the axis of rotation at a radius less than that of the outer bearing race for supporting a mass of lubricating grease; said lubricating grease mass comprising a gelled structure and a lubricating oil releasably trapped in the gelled structure releasable from the gelled structure in response to a predetermined oil release shear stress applied to the lubricating grease mass which is less than the predetermined yield stress for deformation of the gelled structure out of contact with the bearing races against centrifugal force developed upon rotation of the axle of a magnitude at least sufficient to apply the predetermined oil release shear stress to said lubricating grease mass but of a magnitude less than the predetermined yield stress of the gelled structure at the interface between said lubricating grease mass and said grease support surface means, and released oil transfer path means in said housing contiguous with the outer race for receiving released oil transferred thereto under centrifugal force and conducting it to the outer race to lubricate the bearing.

10. In the assembly of claim 9 the axle being hollowed to define the grease support surface means with the axle and the axle being apertured to permit the passage of released oil to the oil transfer path means in the housing.

11. The method of supplying lubricant between bearing surfaces of an axle element and a housing element around it, one of said elements being rotary and having a solid surface thereon facing the axis of rotation thereof, and the other being stationary, which method comprises:
placing a mass of gelled lubricant, comprising a gelled structure and a lubricating oil releasably trapped in the gelled structure and releasable from the gelled structure is response to a predetermined oil release shear stress applied to the gelled lubricant mass which is less than the predetermined yield stress for the deformation of the gelled structure, on said solid surface of the rotary element facing the axis of rotation at a radial distance from the axis of rotation no greater than that of a bearing surface to be lubricated, rotating the rotary element at a speed sufficient to apply a centrifugal force to the gelled lubricant mass whereby a stress is applied to the gelled lubricant mass at least equal to the predetermined oil release shear stress thereof and less than the predetermined yield stress of the gelled structure of the gelled lubricant mass at its interface with said solid surface to release lubricating oil from said gelled lubricant mass, and guiding the released oil to the bearing surface to be lubricated.

12. The method of claim 11 in which the solid surface is part of a removable annulus carried by the rotary element and the annulus is packed with the gelled lubricant.

13. A method of lubricating a bearing surface comprising:

a. subjecting a quantity of supported gelled oil bearing lubricant, comprising a gelled structure and a lubricating oil releasably trapped in the gelled structure and releasably from the gelled structure in response to a predetermined oil release shear stress applied to the gelled lubricant which is less than the predetermined yield stress for the deformation of the gelled structure, to centrifugal force of sufficient magnitude to generate the predetermined oil release shear stress in the gelled oil bearing lubricant to release the oil entrapped in the gelled structure, but of a magnitude less than that required to generate the predetermined yield stress for deformation of the gelled structure in said gelled oil bearing lubricant, and b. guiding the released oil from said gelled lubricant to said bearing surface.

* * * * *

UNITED STATES PATENT OFFICE
CERTIFICATE OF CORRECTION

PATENT NO. : 3,913,992
DATED : October 21, 1975
INVENTOR(S) : William P. Scott and Charles J. Swartz It is certified that error appears in the above-identified patent and that said Letters Patent are hereby corrected as shown below:

Column 12, line 3, after "outer" insert --bearing--.
Column 13, line 2, "is" should be --in--.
Column 14, line 8, "releasably" should be --releasable--.

Signed and Sealed this tenth Day of February 1976

[SEAL]

Attest:

RUTH C. MASON
Attesting Officer

C. MARSHALL DANN
Commissioner of Patents and Trademarks